(12) United States Patent
Lu et al.

(10) Patent No.: US 8,879,241 B2
(45) Date of Patent: Nov. 4, 2014

(54) SERVER RACK AND POWER TRANSMISSION ASSEMBLY THEREOF

(75) Inventors: Tung-Ke Lu, New Taipei (TW); Chin-Han Tsai, New Taipei (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 376 days.

(21) Appl. No.: 13/423,752

(22) Filed: Mar. 19, 2012

(65) Prior Publication Data

US 2013/0058028 A1 Mar. 7, 2013

(30) Foreign Application Priority Data

Sep. 2, 2011 (TW) .............................. 100131837 A (51) Int. Cl.
*H05K 7/00* (2006.01)
*G06F 1/18* (2006.01)

(52) U.S. Cl.
CPC ...................................... *G06F 1/181* (2013.01)
USPC ........... 361/624; 361/724; 361/727; 361/735; 361/775; 361/785; 361/679.31; 174/70 B; 174/71 B; 174/88 B; 174/99 B; 174/149 B (58) Field of Classification Search
CPC ......... G06F 1/188; G06F 1/189; H01R 24/62; H05K 7/1457; H05K 7/1492; H02B 1/21
USPC ............ 361/679.02, 727, 735, 775, 785, 716, 361/824, 826, 624, 637, 639, 679.31; 211/26; 174/72 B, 70 B, 71 B, 88 B, 99 B, 174/149 B; 439/110, 211, 212
See application file for complete search history.

(56) References Cited

U.S. PATENT DOCUMENTS

| | | | | |
|---|---|---|---|---|
| 5,196,987 | A * | 3/1993 | Webber et al. | ................ 361/624 |
| 6,205,029 | B1 * | 3/2001 | Byrne et al. | .................. 361/724 |
| 2004/0228087 | A1 | 11/2004 | Coglitore | |
| 2007/0081308 | A1 | 4/2007 | Ishida | |
| 2009/0225500 | A1 * | 9/2009 | Cherney et al. | ............... 361/622 |
| 2010/0041277 | A1 | 2/2010 | Huber et al. | |
| 2010/0141208 | A1 * | 6/2010 | Deal et al. | ...................... 320/116 |
| 2011/0013348 | A1 * | 1/2011 | Seibold et al. | ........... 361/679.02 |
| 2011/0141665 | A1 * | 6/2011 | Fontana et al. | ............... 361/601 |
| 2011/0255230 | A1 * | 10/2011 | Mori | ........................ 361/679.02 |

FOREIGN PATENT DOCUMENTS

| | | |
|---|---|---|
| JP | 2007-128498 A | 5/2007 |
| JP | 2010-507202 A | 3/2010 |
| TW | 200510994 A1 | 11/2004 |
| TW | M393096 U1 | 11/2010 |

* cited by examiner

*Primary Examiner* — Robert J Hoffberg
*Assistant Examiner* — Mukund G Patel
(74) *Attorney, Agent, or Firm* — Chun-Ming Shih (57) ABSTRACT

A server rack configured for a plurality of servers is disclosed, in which each of the servers has a power supply circuit board. The server rack includes: a case having a first face and a second face opposed to each other, the first face having an opening for the servers to be arranged in the case in an orientation; a power supply module provided on the second face of the case; and a power transmission assembly composed of a busbar provided on the second face in the orientation and electrically connected to the power supply module; and a plurality of electrical connectors provided on the busbar and coupled respectively with the power supply circuit boards of the servers. Through the power transmission assembly, the servers may be powered in a centralized way by the power supply module.

12 Claims, 9 Drawing Sheets

SERVER RACK AND POWER TRANSMISSION ASSEMBLY THEREOF

CROSS-REFERENCE OF RELATED APPLICATIONS

This application claims the benefit of the filing date of Taiwan Patent Application No. TW 100131837, entitled "SERVER RACK AND POWER TRANSMISSION ASSEMBLY THEREOF" and filed on Sep. 2, 2011, which is incorporated herein in its entirety by reference.

FIELD OF THE INVENTION

The invention relates to a server rack; more particular, to a server rack that is capable of providing centralized power supply and a power transmission assembly of the server rack.

DESCRIPTION OF THE PRIOR ART

As the computer technology advances and the internet application becomes more popular, the dependence on the computer and the internet has been increasing. In particular, commercial competitiveness and business efficiency have been significantly improved due to the computerization and networking. In order to provide a more stable environment for computer operations, servers are employed to collect and manage the data and information. In this way, information security, available bandwidth, system performance, and system expandability can be improved. So, servers play an important role in the applications of modern society.

Servers often indicate computers that have higher computing power and may be accessible by users via networks. Besides, servers are categorized into workgroup, department, and enterprise servers according to the computing power. A server operating system indicates the one that is run on the server hardware. Depending on the computing service the server offers, it could be a database server, file server, mail server, print server, web server, FTP server, DNS server, AP server, proxy server, WINS server, or others.

Conventional pedestal servers are large in volume and would occupy a certain amount of space. Whenever a plurality of servers are employed in a company, considerable space is required for the server machines. It is therefore considered to arrange the servers in the rack in stacks or in parallel. Each server in the rack is "compressed" in space and CPU, disk drives, memories, network interfaces, and controller chips, and so on are highly integrated thereon. It is well known that the servers in stacks or in parallel occupy smaller space than the conventional pedestal or rack servers.

However, since each server has its own power supply, in the design of the rack, it's necessary to furnish each server with an individual power supply. As a result, the cost for the arrangement of the servers and power consumption are increased due to the increased number of power supplies. Therefore, arranging the servers in stacks or in parallel is not economic in practice.

SUMMARY OF THE INVENTION

In view of the forgoing problems, the invention discloses a server rack and a power transmission assembly thereof. The server rack is capable of centralizing power supplies to all of the servers. Thus, over-consumption of energy caused by the situation where each server is equipped with an individual power supply as in prior art can be avoided.

The server rack of the invention is configured for a plurality of servers each of which has a power supply circuit board. The server rack includes a case, a power supply module and a power transmission assembly. The case includes an accommodating space, a first face having an opening for the servers to be arranged in a case in an orientation and a second face opposite to the first face. The power supply module is provided on the second face of the case. The power transmission assembly, including a busbar that connected to the power supply module on the second face and a plurality of electrical connectors that are provided on the busbar and coupled respectively with the power supply circuit boards of the servers, is also provided on the second face parallel to the orientation.

The power transmission assembly of the invention is suitable for a server rack having a plurality of servers arranged in an orientation in the server rack. The power transmission assembly includes a busbar provided in a direction parallel to the orientation and a plurality of electrical connectors provided on the busbar and coupled respectively with the servers.

The invention is advantageous in some respects. Through the configuration of the power supply module and power transmission assembly, the servers may be powered in a centralized way, canceling the need of separate power supplies for the servers. The power consumption may be saved and the design of the server rack may be simplified, thus significantly reducing the manufacturing cost.

The characteristics, realization and functions of the invention are disclosed in the following description with reference to the preferred exemplified embodiments and the accompanying drawings.

DETAILED DESCRIPTION OF THE INVENTION

From the above description of the invention, it is manifest that various techniques can be used for implementing the concepts of the invention without departing from the scope thereof. Moreover, while the invention has been described with specific reference to certain embodiments, a person of ordinary skills in the art would recognize that changes can be made in form and detail without departing from the spirit and the scope of the invention. The described embodiments are to be considered in all respects as illustrative and not restrictive. It is intended that the scope of the invention is defined by the appended claims.

Figure 1A:
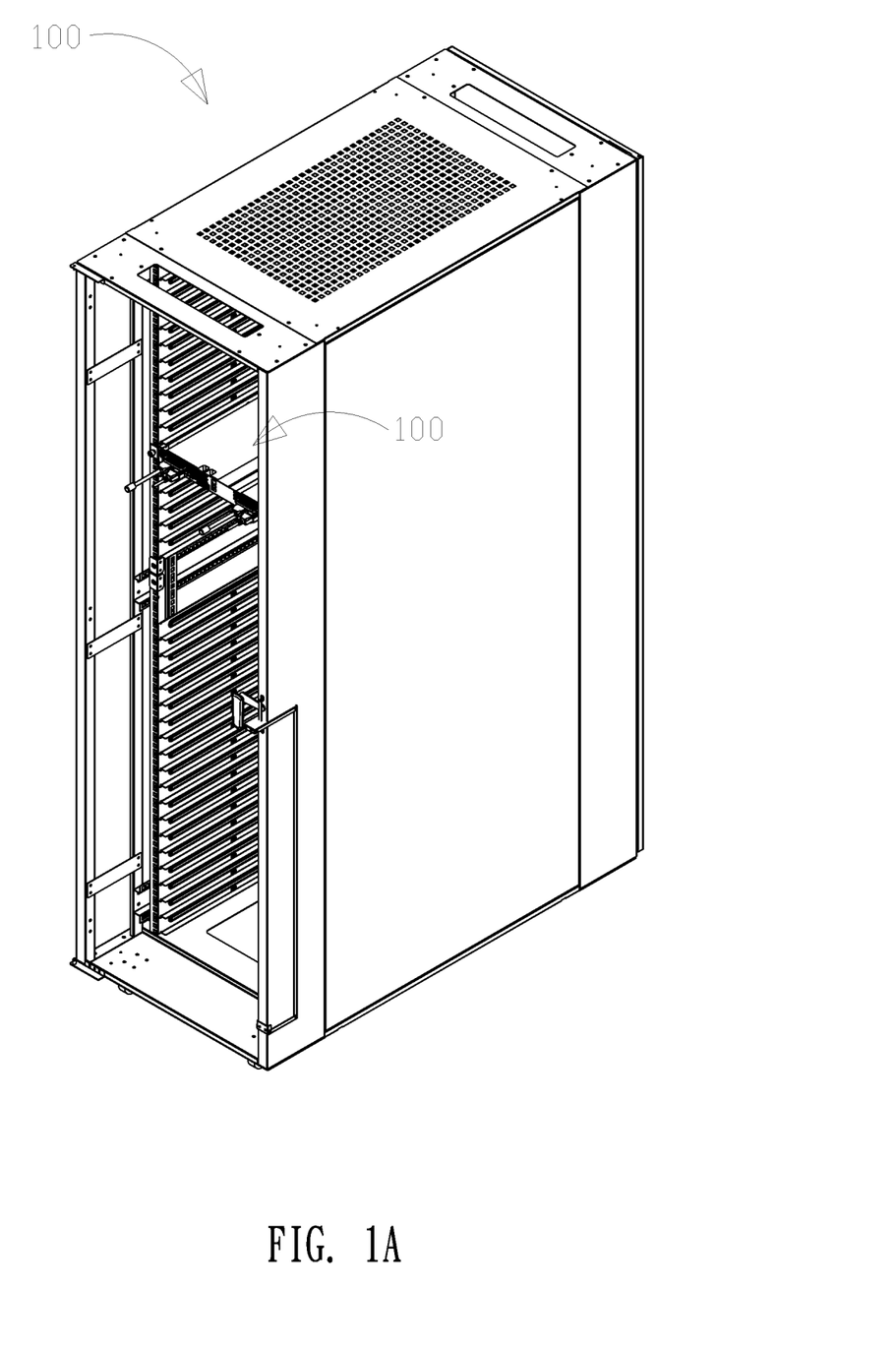
FIG. 1A is a schematically three-dimensional view of the computer rack according to one preferred embodiment of the invention.
Figure 1B:
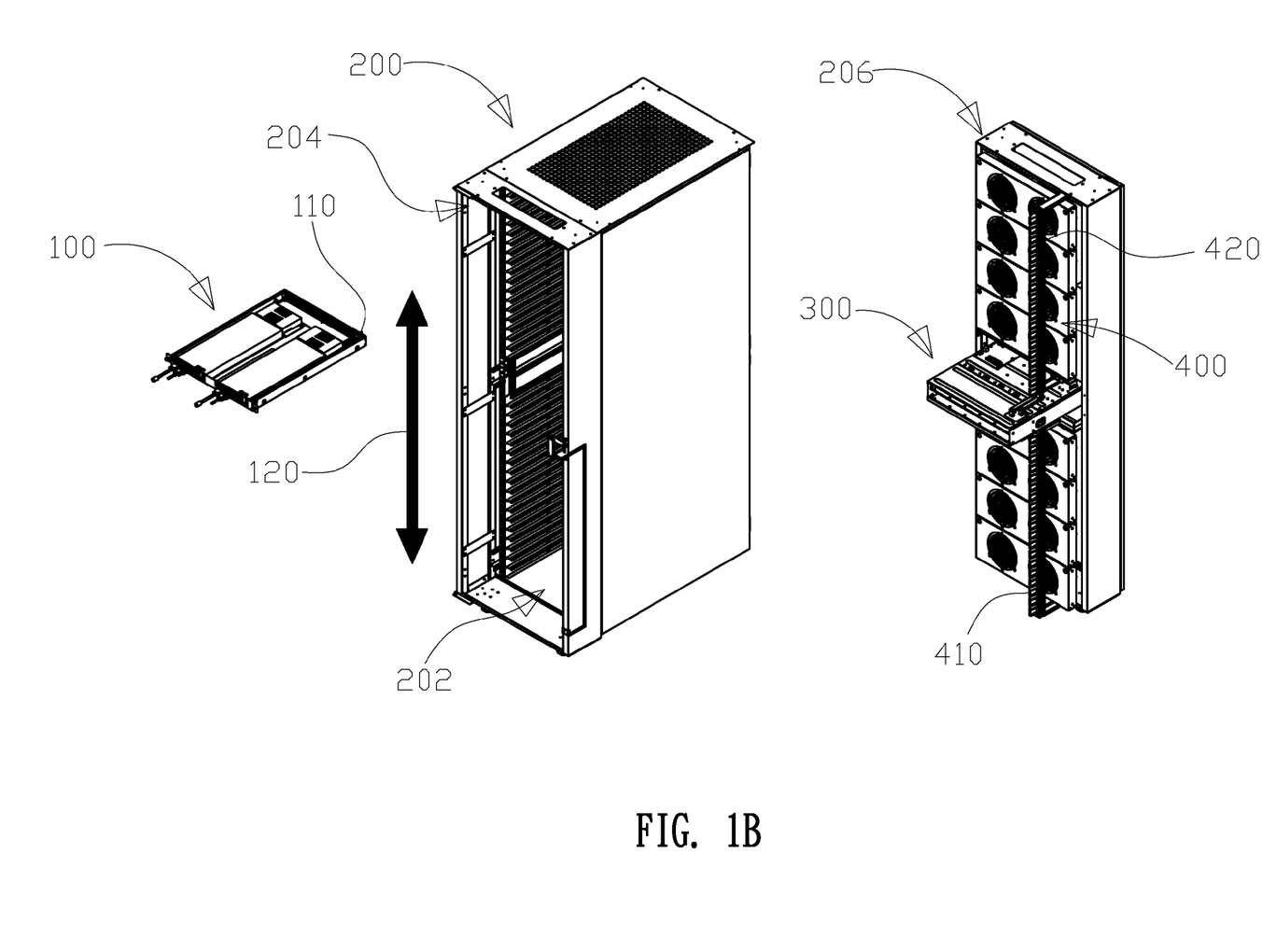
FIG. 1B is a schematically exploded view of the computer rack according to one preferred embodiment of the invention.

FIGS. 1A and 1B are respectively a schematically three-dimensional view and a schematically exploded view of the computer rack according to one preferred embodiment of the invention. The server rack of the invention is configured for a plurality of servers 100, each of which includes a power supply circuit board 110. The power supply board 110 has a conducting copper foil at the front thereof.

In one embodiment, the server rack of the invention includes a case 200, a power supply module 300 and a power transmission assembly 400. The case 200 has an accommodating space 202, a first face 204 and a second face 206. An opening is provided to the first face 204 so that the servers may be disposed within the case 200 from the opening in an orientation 120. The power supply module 300 is provided on the second face 206 of the case 200. The case 200 may be provided with sliding rails for facilitating the installation of the servers 100 thereinto. The sliding rails are positioned in a direction that the power transmission assembly 400 is disposed within the case 200.

It is noted that only one server 100 is taken for illustration in this embodiment. The power transmission assembly 400 that is provided on the second face 206 in a direction of the orientation 120 is electrically connected to the power supply module 300. Specifically, in this embodiment, the power transmission assembly 400 includes a plurality of electrical connectors 410 and a busbar 420 on which the electrical connectors 410 are located, wherein the busbar 420 is provided on the second face 206 in the direction of the orientation 120 and electrically connected to the power supply module 300. As shown in FIG. 1B, when the server 100 is disposed in the case 200, the electrical connector 410 is coupled with the power supply circuit board 110 of the server 100 via a copper foil, thereby leading to an electrically conducting state.

Both of the power supply module 300 and the power transmission module 400 on which a plurality of electrical connectors 410 coupled with the power supply module 300 are provided are set on the second face 206. In this way, the server 100, when installed in the case 200, may be coupled with the electrical connector 410.

In practice, multiple servers 100 may be disposed in the case 200. The power supply module 300 is not required for each server 100 since the power transmission assembly 400 can centralize and then furnish the power provided by the power supply module 300 to the servers 100. Thus, lower power consumption can be effectively achieved.

Figure 2A:
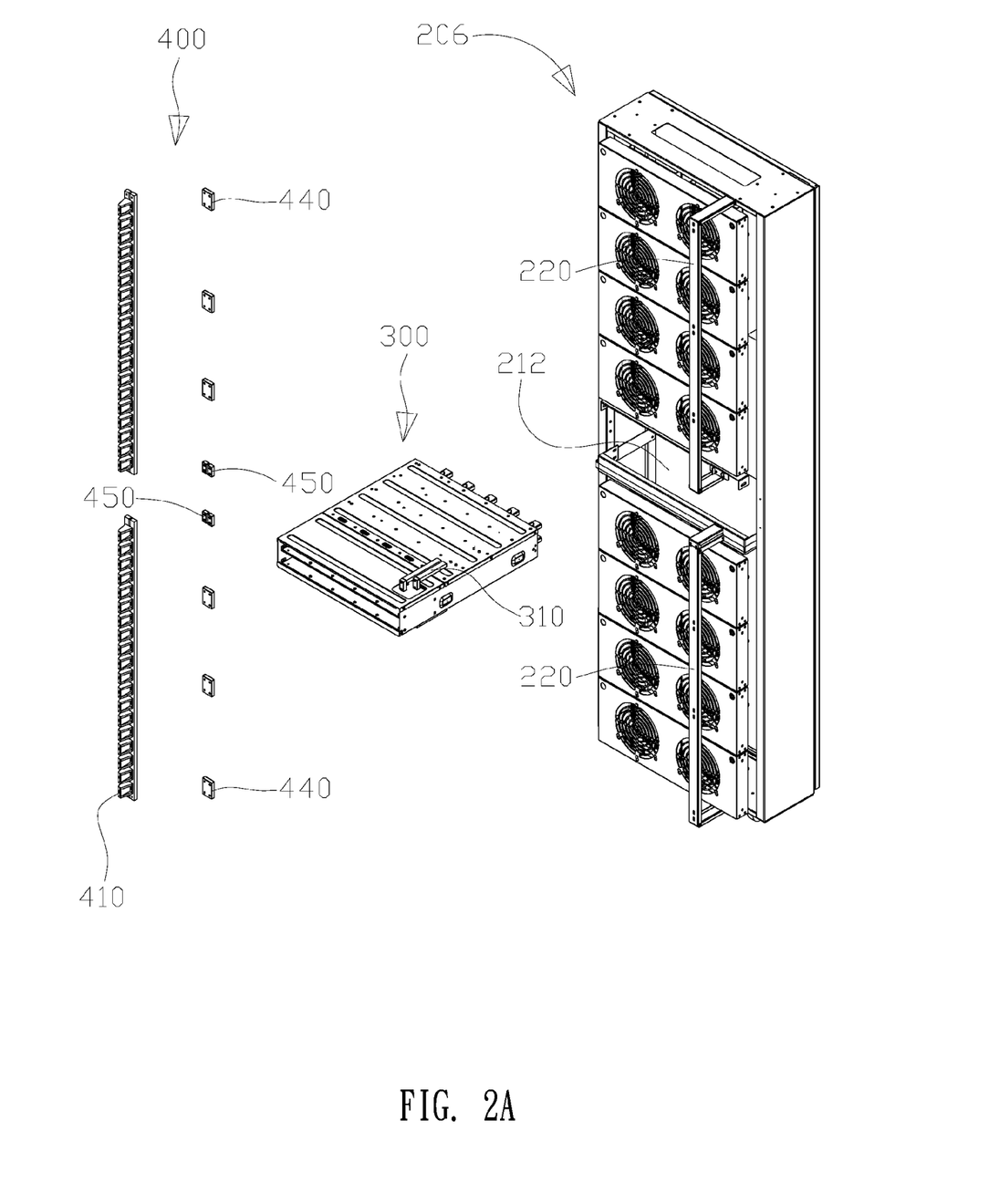
FIG. 2A is a schematic view of the power supply module and power transmission assembly according to one preferred embodiment of the invention.
Figure 2B:
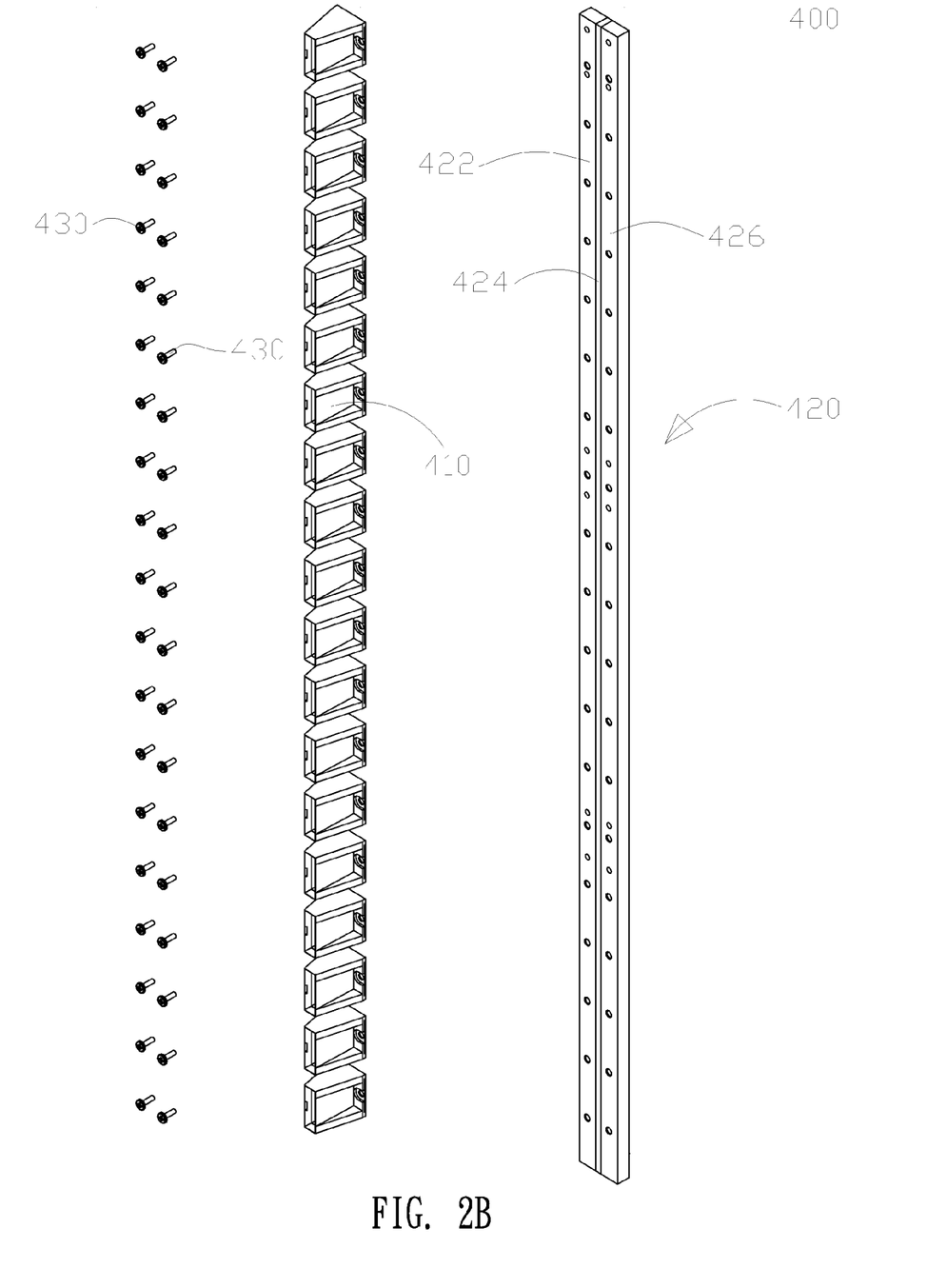
FIG. 2B is a schematically exploded view of the power transmission assembly according to one preferred embodiment of the invention.
Figure 3A:
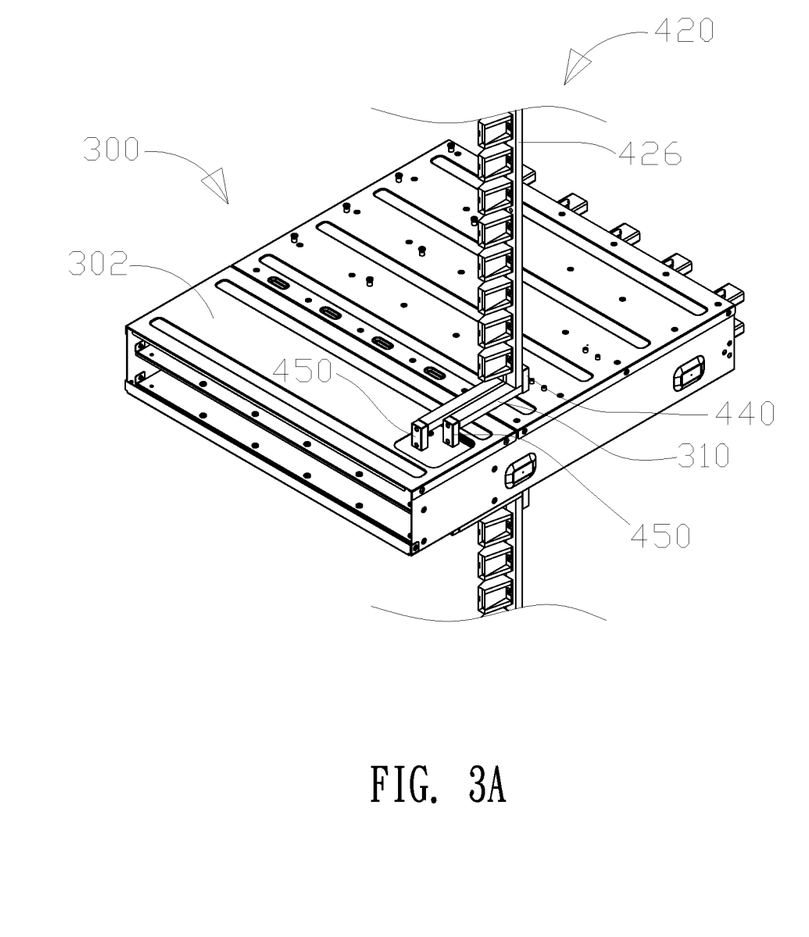
FIG. 3A is a schematically three-dimensional view of the power transmission assembly when disposed to the power supply module according to one preferred embodiment of the invention.
Figure 3B:
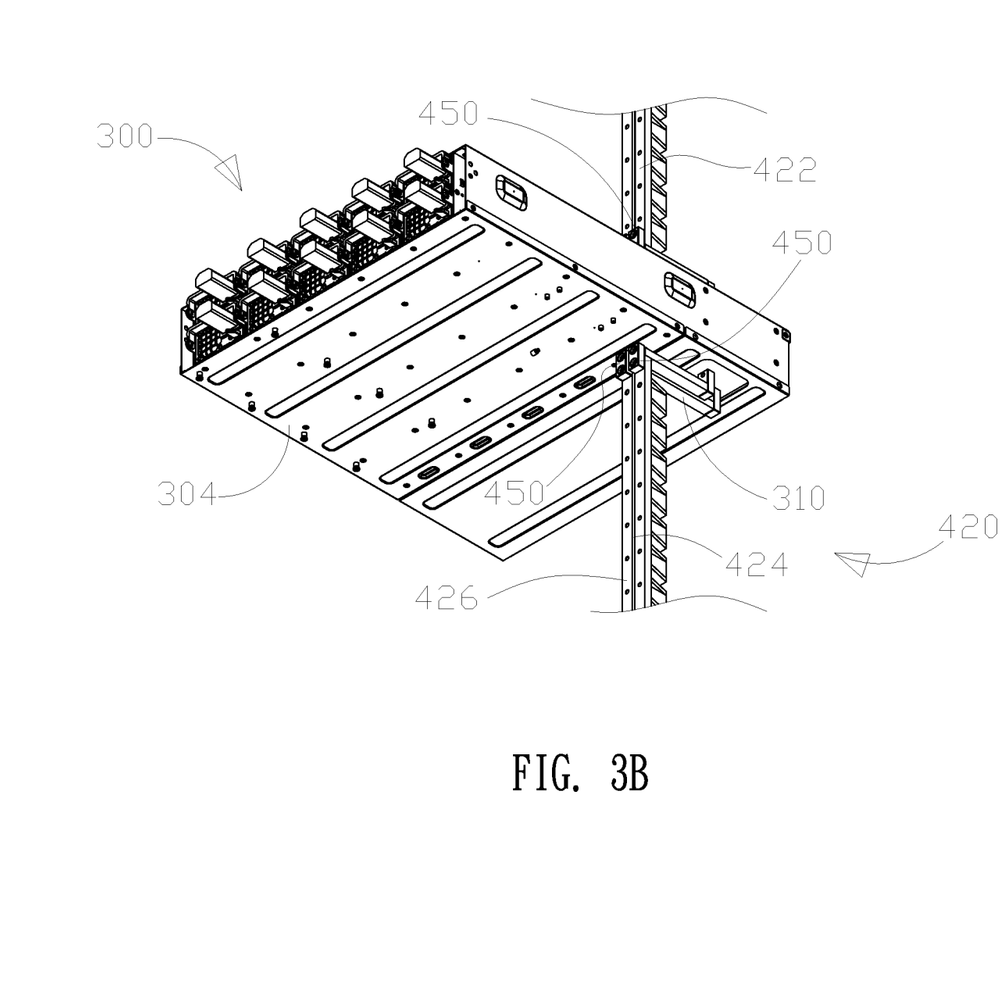
FIG. 3B is a schematically three-dimensional view of the power transmission assembly when disposed to the power supply module according to one preferred embodiment of the invention.

FIGS. 2A and 2B are respectively a schematic view and a schematically exploded view of the power supply module and power transmission assembly according to one preferred embodiment of the invention. FIGS. 3A and 3B are schematically three-dimensional views from different visual angles of the power transmission assembly when disposed to the power supply module according to one preferred embodiment of the invention.

As shown in FIG. 2A, the power supply module 300 is located on the second face 206. It is to be noted that some devices such as fans and circuits will also be located on the second face 206. The details thereof will not be described here for avoiding unnecessary confusion with the invention. In this embodiment, the power supply module 300 is disposed on the second face 206 by placing directly in the case 200. The second face 206 is also provided in the middle with a volume 212 where the power supply module 300 is located. Besides, there are individual power transmission assemblies 400 provided both above and below the power supply module 300.

Alternatively, the volume 212 may be located on the upper or lower part of the second face 206, and one power transmission assembly 400 may be located above or below the power supply module 300. As a result, however, since the power transmission assembly 400 in this condition is longer, the end thereof far away from the power supply module 300 has a larger resistance and therefore a higher power consumption. So it is advantageous for the volume 212 to be located in the middle of the second face 206. In this way, the length of the power transmission assembly 400 below/above the power supply module 300 is shorter, which is helpful in reducing the power consumption.

Referring to FIG. 2B again, the power transmission assembly 400 of the invention includes the electrical connectors 410 and the busbar 420. The busbar 420 includes a first conducting pillar 422, a second conducting pillar 426 juxtaposed with the first conducting pillar 422, and an insulator 424 interposed between the first conducting pillar 422 and the second conducting pillar 426.

In this embodiment, both the first conducting pillar 422 and the second conducting pillar 426 are made of copper metal or copper alloy. Copper metal is a good electrical conductor and thus has a low resistance. As we know, pure copper metal has a conductivity of $59.6 \times 10^6$ mΩ, and the conductivity of the annealed copper, $58.0 \times 10^6$ mΩ, is defined to be 100% IACS (International Annealed Copper Standard) at 20° C. Besides, the conductivity is approximately 44-55% IACS for copper-tungsten, 27-28% IACS for brass alloy, and 13-20% IACS for phosphor bronze. Since copper alloy has a lower conductivity than pure copper metal, the latter is used as the material of the first conducting pillar 422 and the second conducting pillar 426 in the invention, thereby reducing the energy consumption during power transport.

For further reducing the power consumption, the isolator 424 is interposed between the first conducting pillar 422 and the second conducting pillar 426 for preventing the contact of the both during power-on and the presence of charge between the both. In this way, the server 100 or power supply module 300 may be kept from breakdown.

The electrical connector 410 of the invention electrically connects and fastens to the first and the second conducting pillars 422 and 426 via a plurality of fasteners. The electrical connector 410 of the invention includes two electrodes through which the fasteners 430 can fasten to the first and the second conducting pillars 422 and 426. Electricity is thus transported from the first and the second conducting pillars 422 and 426 to the both electrodes via the fasteners 430. The fasteners 430 of the invention may be made of, for example, pure copper metal or copper alloy, while the invention is not limited thereto.

Additionally, in the embodiment, for the power transmission assembly 400, since the first and the second conducting pillars 422 and 426 are used for the purpose of illustration, a single-phase two-wire system is used accordingly. For example, the first conducting pillar 422 is connected to the live wire, while the second conducting pillar 426 is connected to the neutral wire. It is to be noted that the number of both conducting pillars may be increased or adjusted as the case may be. In the case of a single-phase three-wire system, three first or second conducting pillars 422 or 426 will have to be used for being connected to two live wires and one neutral wire. In order to avoid short circuit faults, the insulator 424 may have to be interposed between two adjacent conducting pillars.

Further, a support 220 is provided to the second face 206 for facilitating the placement of the power transmission assembly 400 to the second face 206. The power transmission assembly 400 is set onto the support 220 which is often made of metal like the second face 206 for enhancing the assembling strength of the power transmission assembly 400 and the second face 206.

However, if the power transmission assembly 400 is provided directly to the support 220, short-circuit may occur between the first and the second conducting pillars 422 and 426 since they are made of metal as well. Hence, in the embodiment, a plurality of insulating pads 440 are further interposed between the power transmission assembly 400 and the second face 206 for isolating the conducting pillars 422 and 426 from the support 220.

In addition, the support 220 of the embodiment may be made of an insulating material, thus eliminating the need of the insulating pads 440. This will have some impact on the strength of the entire structure, while for a small computer rack, the impact may be negligible, and it helps to reduce the manufacturing cost.

As shown in FIGS. 3A and 3B, the power supply module 300 of the invention has a first bonding face 302 and a second bonding face 304 opposed to each other on both of which a conducting terminal 310 is respectively provided. One busbar 420 is electrically connected to the conducting terminal 310 of the first bonding face 302 of the power supply module 300, and the other busbar 420 is electrically connected to the conducting terminal 310 of the second bonding face 304 of the power supply module 300. The power transmission assembly 400 is coupled with the conducting terminal 310 for enabling transport of power from the power transmission assembly 400 to the server 100.

Besides, in one embodiment, the server rack of the invention further includes a conductive fastener 450 that fastens the conducting terminal 310 to the power transmission assembly 400. The conductive fastener 450 may be made of pure copper metal or copper alloy for decreasing the energy consumption when power transport occurs between the power transmission assembly 400 together with the conductive fastener 450 and the conducting terminal 310.

Figure 4A:
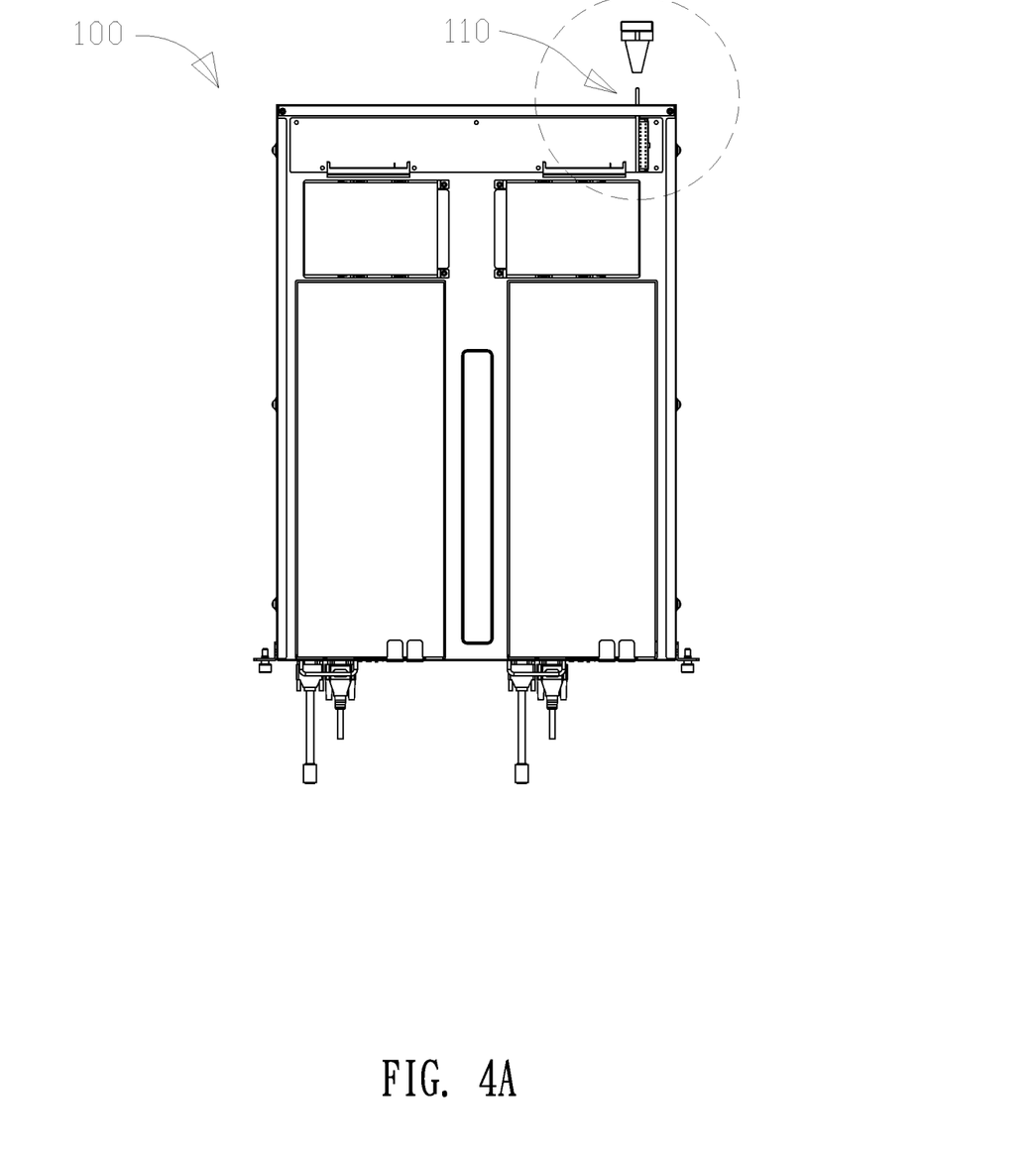
FIG. 4A is a schematic view of the configuration of the server and electrical connector according to one preferred embodiment of the invention.
Figure 4B:
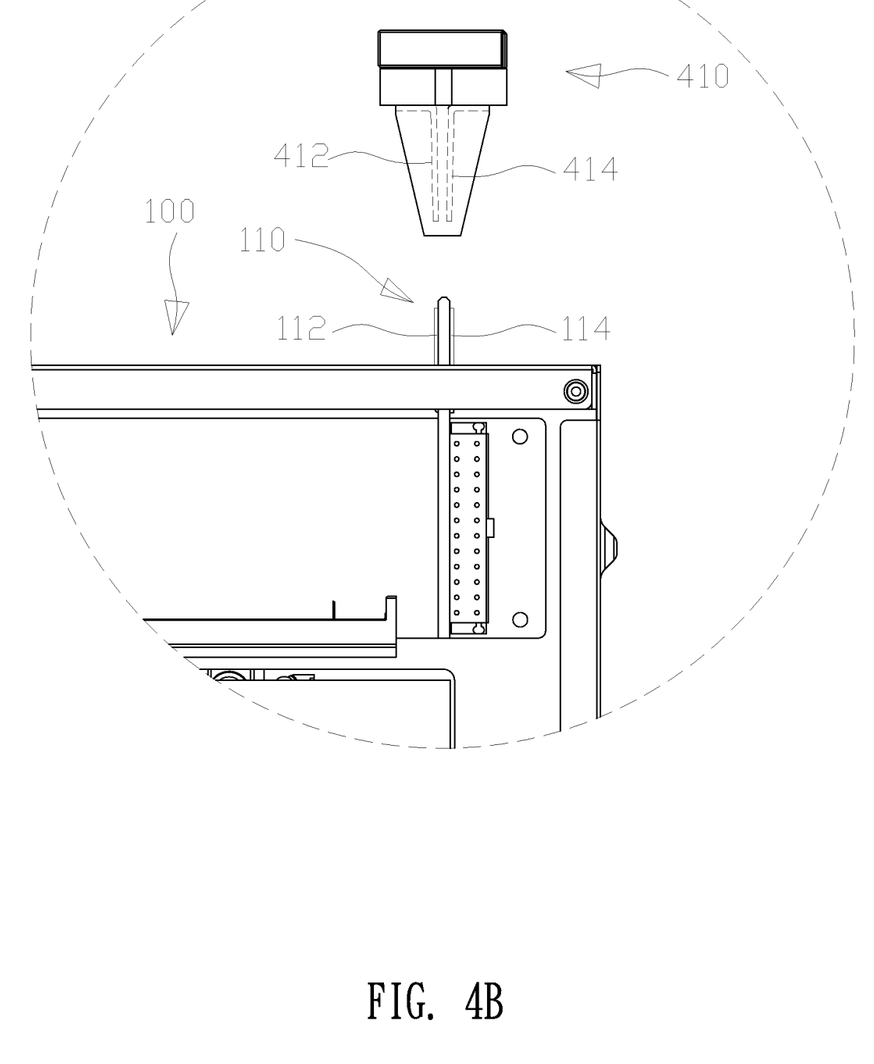
FIG. 4B is a locally enlarged view of FIG. 4A.
Figure 4C:
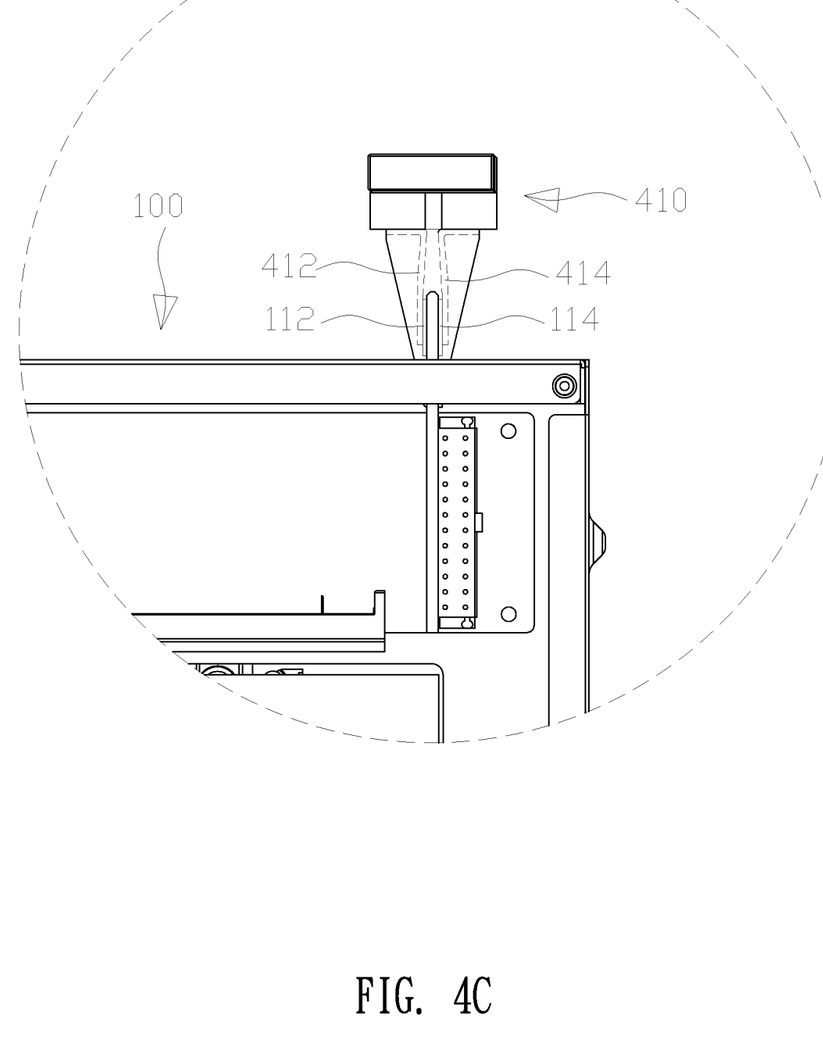
FIG. 4C is a schematic view of combination of the server with the electrical connector according to one preferred embodiment of the invention.

FIG. 4A is a schematic view of the configuration of the server and electrical connector according to one preferred embodiment of the invention, FIG. 4B is a locally enlarged view of FIG. 4A, and FIG. 4C is a schematic view of combination of the server with the electrical connector according to one preferred embodiment of the invention.

As shown in FIGS. 4A-4C, the power supply circuit board 110 of the server 100 of the invention having a first electrode 112 and a second electrode 114 at both sides is connected to one electrical connectors 410 having a first conducting sheet 412 and a second conducting sheet 414, in which the one electrical connector 410 is connected to the first and the second electrodes 112 and 114. The first and the second conducting sheets 412 and 414 are coupled with the first and the second conducting pillars 422 and 426 respectively via a fastener 430.

In this embodiment, no power supply module but a power supply circuit board 110 is provided to the server 100. The power supply circuit board 110 may be placed on a circuit board. When the server 100 is set in the case 200, the power supply circuit board 110 will be connected to the electrical connector 410 in such a way that the first and the second electrodes 112 and 114 are attached to the first and the second conducting sheets 412 and 414 respectively. Therefore, power may be transported to the server 100 through the electrical connector 410. Because no individual power supply is required for the server 100, the manufacturing cost can be reduced, installation of the server 100 into the case 200 can be more convenient, and energy efficiency can be improved.

As described above, by means of the design and arrangement of the power supply module and the power transmission assembly, the server rack of the invention is capable of centralizing power supply to the servers without providing an individual power supply module for each server. Thus, the power consumption and the cost can be reduced significantly owing to the simplification of such configuration. Furthermore, the centralized power supply system of the invention can combine different types of servers. For example, the blade server and conventional pedestal or rack mount server may be used in combination in the server rack of the invention where the servers are powered in a centralized way.

From the above description of the invention, it is manifest that various techniques can be used for implementing the concepts of the invention without departing from the scope thereof. Moreover, while the invention has been described with specific reference to certain embodiments, a person of ordinary skills in the art would recognize that changes can be made in form and detail without departing from the spirit and the scope of the invention. The described embodiments are to be considered in all respects as illustrative and not restrictive. It is intended that the scope of the invention is defined by the appended claims.

What is claimed is:

1. A server rack configured for a plurality of servers, the plurality of the servers each having a power supply circuit board, the server rack comprising:
   a case having a first face and a second face opposed to each other, the first face having an opening for the servers to be arranged in the case in an orientation;
   a power supply module provided on the second face of the case; wherein the power transmission assembly further comprises:
   a power transmission assembly comprising:
   a busbar provided on the second face in the orientation and electrically connected to the power supply module; and the busbar further comprising a first conducting pillar, a second conducting pillar juxtaposed with the first conducting pillar, and an insulator disposed between the first conducting pillar and the second conducting pillar;
   a plurality of electrical connectors provided on the busbar and coupled respectively with the power supply circuit boards of the servers, wherein each of the electrical connectors has a first conducting sheet and a second conducting sheet, both of which are coupled with the power supply module via the first conducting sheet and the second conducting sheet of each of the electrical connectors are connected to first conducting pillar and the second conducting pillar respectively, the power supply circuit board of each of the servers has a first electrode and a second electrode, and inside surfaces of the first conducting sheet and the second conducting sheet are in contact with outer surfaces of the first electrode and the second electrode respectively; and
   a plurality of fasteners for fastening the first conducting sheets and the second conducting sheets of the electrical connectors to the first conducting pillar and the second conducting pillar respectively.

2. The server rack according to claim 1, wherein the first conducting pillar and the second conducting pillar are made of copper metal or copper alloy.

3. The server rack according to claim 1, wherein the fasteners are made of copper metal or copper alloy.

4. The server rack according to claim 1, further comprising a conductive fastener for coupling the busbar to a conducting terminal of the power supply module.

5. The server rack according to claim 1, wherein the power transmission assembly comprises a first busbar and a second busbar, the power supply module is located in the middle of the second face and has a first bonding face and a second bonding face, wherein the first busbar is electrically connected to the first bonding face of the power supply module, and the second busbar is electrically connected to the second bonding face of the power supply module.

6. The server rack according to claim 5, wherein the power supply module further comprises a first and a second conducting terminals respectively provided to the first bonding face and the second bonding face, the first busbar is connected to the first bonding face of the power supply module and coupled with the first conducting terminal, the second busbar is connected to the first bonding face of the power supply module and coupled with the second conducting terminal.

7. The server rack according to claim 1, wherein the power transmission assembly further comprises a support disposed on the second face in the orientation, and the busbar is provided on the support.

8. The server rack according to claim 7, further comprising a plurality of insulating pad between the busbar and the support.

9. The server rack according to claim 7, wherein the support is made of an insulating material.

10. A power transmission assembly for a server rack having a plurality of servers arranged in an orientation, comprising:

a busbar provided in a direction parallel to the orientation; and the busbar further comprising a first conducting pillar, a second conducting pillar juxtaposed with the first conducting pillar, and an insulator disposed between the first conducting pillar and the second conducting pillar;

a plurality of electrical connectors provided on the busbar and coupled respectively with the servers, wherein each of the electrical connectors has a first conducting sheet and a second conducting sheet, both of which are coupled with the power supply module via the first conducting sheet and the second conducting sheet of each of the electrical connectors are connected to the first conducting pillar and the second conducting pillar respectively, the power supply circuit board of each of the servers has a first electrode and a second electrode, and inside surfaces of the first conducting sheet and the second conducting sheet are in contact with outer surfaces of the first electrode and the second electrode respectively; and a plurality of fasteners for fastening the first conducting sheets and the second conducting sheets of the electrical connectors to the first conducting pillar and the second conducting pillar respectively.

11. The power transmission assembly according to claim 10, wherein the first conducting pillar and the second conducting pillar are made of copper metal or copper alloy.

12. The power transmission assembly according to claim 10, wherein the fasteners are made of copper metal or copper alloy.

* * * * *